United States Patent
Graham

(10) Patent No.: US 11,907,988 B2
(45) Date of Patent: Feb. 20, 2024

(54) SYSTEMS AND METHODS FOR PROVIDING GEOLOCATION SERVICES IN A MOBILE-BASED CROWDSOURCING PLATFORM

(71) Applicant: CrowdComfort, Inc., Boston, MA (US)

(72) Inventor: B. Eric Graham, Wenham, MA (US)

(73) Assignee: CrowdComfort, Inc., Boston, MA (US)

( * ) Notice: Subject to any disclaimer, the term of this patent is extended or adjusted under 35 U.S.C. 154(b) by 0 days.

(21) Appl. No.: 17/551,858

(22) Filed: Dec. 15, 2021

(65) Prior Publication Data

US 2022/0222724 A1 Jul. 14, 2022

Related U.S. Application Data

(63) Continuation-in-part of application No. 17/530,147, filed on Nov. 18, 2021, and a continuation-in-part of application No. 17/182,667, filed on Feb. 23, 2021, now Pat. No. 11,394,463.

(60) Provisional application No. 63/125,727, filed on Dec. 15, 2020.

(51) Int. Cl.

| | |
|---|---|
| *H04B 10/00* | (2013.01) |
| *G06Q 30/0601* | (2023.01) |
| *G06T 19/00* | (2011.01) |
| *G06K 7/14* | (2006.01) |
| *G06Q 30/0201* | (2023.01) |
| *G06F 18/25* | (2023.01) |
| *H04L 67/12* | (2022.01) |

(52) U.S. Cl.
CPC ....... *G06Q 30/0623* (2013.01); *G06F 18/251* (2023.01); *G06K 7/1417* (2013.01); *G06Q 30/0201* (2013.01); *G06T 19/006* (2013.01); *G06T 2219/024* (2013.01); *H04L 67/12* (2013.01)

(58) Field of Classification Search
CPC ...... H04B 10/116; H04L 67/18; H04W 4/029; H04W 4/33; H04W 4/026
See application file for complete search history.

(56) References Cited

U.S. PATENT DOCUMENTS

| | | | |
|---|---|---|---|
| 9,247,520 B2 * | 1/2016 | Malik | H04W 64/00 |
| 9,301,100 B1 * | 3/2016 | Jampani | G01S 5/02526 |
| 9,565,521 B1 * | 2/2017 | Srinivasan | H04M 1/72457 |

(Continued)

*Primary Examiner* — Agustin Bello
(74) *Attorney, Agent, or Firm* — Nutter McClennen & Fish LLP

(57) ABSTRACT

The present invention provides systems and methods for providing interactive visual images in a mobile-based crowdsourcing platform. More specifically, the system of the present invention includes a plurality of remote mobile devices and a visual imaging system configured to communicate and exchange data with a cloud-based service, such as a crowdsourcing platform. The crowdsourcing platform generally provides a geolocation service based on the crowdsourcing, or polling, of users of the mobile devices, in addition to visual data captured by the visual imaging system, so as to determine location and movement of the users within a specific environment. The system is further configured to automatically render an augmented or virtual reality floor plan or layout of a location based on the user data and visual data.

18 Claims, 15 Drawing Sheets

(56) References Cited

U.S. PATENT DOCUMENTS

| | | | |
|---|---|---|---|
| 9,625,922 B2* | 4/2017 | Graham | F24F 11/30 |
| 9,681,468 B2* | 6/2017 | Lee | H04W 4/70 |
| 10,185,921 B1* | 1/2019 | Heller | G07C 9/38 |
| 10,379,551 B2* | 8/2019 | Daoud | G05B 15/02 |
| 10,802,515 B2* | 10/2020 | Mirza | F24F 11/30 |
| 10,958,341 B2 | 3/2021 | Daoud et al. | |
| 10,963,928 B2* | 3/2021 | Sundaresan | G06Q 30/0282 |
| 11,085,660 B2* | 8/2021 | Graham | F24F 11/50 |
| 11,181,936 B2* | 11/2021 | Daoud | G06F 3/002 |
| 11,215,967 B2* | 1/2022 | Kempf | G05B 19/406 |
| 2009/0119142 A1* | 5/2009 | Yenni | H04L 67/12 705/7.15 |
| 2009/0157309 A1* | 6/2009 | Won | G01C 21/20 701/533 |
| 2011/0115816 A1* | 5/2011 | Brackney | H05B 47/10 700/295 |
| 2012/0154169 A1* | 6/2012 | Hoekstra | G07F 9/009 340/870.01 |
| 2013/0059598 A1* | 3/2013 | Miyagi | H04W 4/023 455/456.1 |
| 2013/0109413 A1* | 5/2013 | Das | H04W 4/33 455/456.6 |
| 2013/0144546 A1* | 6/2013 | Brackney | G06Q 10/063 702/61 |
| 2013/0169681 A1* | 7/2013 | Rasane | G06T 19/003 345/633 |
| 2014/0286644 A1* | 9/2014 | Oshima | H04B 10/11 398/118 |
| 2015/0081107 A1* | 3/2015 | Graham | G05B 15/02 700/276 |
| 2015/0193716 A1* | 7/2015 | Tanigawa | G06Q 10/06393 705/7.39 |
| 2015/0204676 A1* | 7/2015 | Zhang | G01S 5/0294 701/410 |
| 2015/0248917 A1* | 9/2015 | Chang | G11B 27/031 386/282 |
| 2015/0253144 A1* | 9/2015 | Rau | G01C 21/343 705/348 |
| 2016/0026837 A1* | 1/2016 | Good | G16H 40/20 340/539.13 |
| 2016/0323690 A1* | 11/2016 | Daoud | G06F 40/154 |
| 2017/0013416 A1* | 1/2017 | Daoud | H04W 40/20 |
| 2017/0026804 A1* | 1/2017 | Tsai | G01S 5/02526 |
| 2017/0141848 A1* | 5/2017 | Daoud | H04B 10/116 |
| 2017/0177723 A1* | 6/2017 | Price | G06Q 10/109 |
| 2017/0230118 A1* | 8/2017 | Shatz | H04M 1/72403 |
| 2017/0238153 A1* | 8/2017 | Daoud | H04W 4/029 455/466 |
| 2017/0245104 A1* | 8/2017 | Klimek | G01S 5/0226 |
| 2017/0269617 A1* | 9/2017 | Daoud | G06Q 10/06 |
| 2017/0318149 A1* | 11/2017 | Daoud | H04W 4/029 |
| 2017/0371024 A1* | 12/2017 | Ivanov | H04W 4/02 |
| 2019/0266404 A1* | 8/2019 | Spivack | G06V 20/35 |
| 2019/0306303 A1* | 10/2019 | Daoud | H04M 1/72457 |
| 2020/0213006 A1* | 7/2020 | Graham | H04B 10/116 |
| 2021/0297154 A1* | 9/2021 | Daoud | H04L 67/52 |
| 2021/0400195 A1* | 12/2021 | Adato | G06Q 10/06312 |
| 2022/0004683 A1* | 1/2022 | Crabtree | G06F 8/10 |
| 2022/0222724 A1* | 7/2022 | Graham | G06Q 30/0201 |

* cited by examiner

SYSTEMS AND METHODS FOR PROVIDING GEOLOCATION SERVICES IN A MOBILE-BASED CROWDSOURCING PLATFORM

CROSS-REFERENCE TO RELATED APPLICATIONS

The present application is a continuation-in-part of U.S. patent application Ser. No. 17/182,667, filed Feb. 23, 2021 entitled SYSTEMS AND METHODS FOR PROVIDING GEOLOCATION SERVICES IN A MOBILE-BASED CROWDSOURCING PLATFORM and U.S. patent application Ser. No. 17/530,147, filed Nov. 18, 2021 entitled SYSTEMS AND METHODS FOR PROVIDING AUGMENTED REALITY-LIKE INTERFACE FOR THE MANAGEMENT AND MAINTENANCE OF BUILDING SYSTEMS, and also claims priority to U.S. Provisional Patent Application No. 63/125,727, filed Dec. 15, 2020, all of which are incorporated herein by reference in their entireties.

FIELD OF THE INVENTION

The present disclosure relates generally to management systems and methods, and, more particularly, to a system for providing a mobile-based crowdsourcing platform configured to provide an intuitive and semi-automated means of collecting and managing user-driven data.

BACKGROUND

Geolocation (or localization) is a term that describes a broad range of technologies for deriving the spatial location (e.g., X, Y, Z Cartesian coordinates) of an object by processing transmitted signals that are received, emitted, or reflected by that object. For example, geolocation may include the identification of the real-world geographic location of an object, such as a radar source, mobile phone, or Internet-connected computer terminal. Geolocation may ultimately refer to the practice of assessing the location, or to the actual assessed location. Accordingly, the location of a person may be determined based, at least in part on, data received from a mobile device that the person is carrying or otherwise associated with.

A primary challenge for many geolocation systems is the ability to determine an indoor location or position of a user. For example, traditional location techniques, such as global positioning satellite (GPS) are shown to be unsuccessful in indoor environments because physical barriers degrade GPS signals. GPS relies on accurate distance estimation between the fixed station (GPS satellite) and mobile station (the receiver). This distance is obtained accurately if and only if the link between the two stations is not blocked by any other objects and line-of-sight (LOS) conditions exist between the transmitter and receiver. In indoor environments, however, the GPS signals are blocked by different objects, so they are attenuated to such an extent that they are either not detectable by the receiver or the distance estimation process yields highly inaccurate distance.

Some companies have relied on different methods for dealing with the issues caused by indoor environments by utilizing multiple signal sources, including GPS readings, magnetic field readings, received-signal-strength (RSS) techniques, radiofrequency (RF) signals, and other readings for determining the location of a user within an indoor environment. The current methods, however, suffer from drawbacks. For example, current methods as described above generally require the installation of hardware devices within, or in proximity to, the indoor environment. The hardware devices may include, for example, beacon-type devices configured to capture and record the multitude of signals so as to compensate for the indoor barriers. Furthermore, such methods also require the use of a known layout or floor plan in order to determine the indoor location of the user, wherein, without such known layouts, the systems will fail to function as intended.

SUMMARY

The present invention provides systems for providing interactive visual images in a mobile-based crowdsourcing platform, the system comprising: a mobile device for user input and interaction; a visual imaging system; and a server configured to communicate with and exchange data with the mobile device and the visual imaging system, the server comprising a processor coupled to a memory containing instructions executable by the processor to cause the server to: receive user data from the mobile device and visual imaging system, the user data and visual image data associated with at least one of a location of a user and movement of the user within an environment over a period of time; and render a layout of the environment based on the user data and visual image data, wherein rendering comprises generating a visual model of a layout of the environment in which the user is located or moving to provide an altered reality wherein the user can track information related to the environment.

In some embodiments, the mobile device comprises a tablet computer, a laptop computer, a notebook computer, a mobile computing device, a smart phone, or a cellular telephone, and the visual imaging system comprises a security camera, a drone, or a smart phone. In certain embodiments, the server and at least one of the mobile device and the visual imaging system are configured to wirelessly communicate and exchange data with one another over a network (e.g., Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, and Near Field Communication (NFC)). In some embodiments, the communication and exchange of data between the server and at least one of the mobile device and the visual imaging system is provided via a cloud-based service.

In some illustrative embodiments, the user data associated with at least one of user location and user movement is data captured by one or more sensors of the mobile device configured to capture data related to at least one of motion or position of the mobile device, signals transmitted from or to the mobile device, and direct user input with the mobile device (e.g., a motion sensor, a received signal strength (RSS) sensor, a global positioning satellite (GPS) sensor, and a touch sensor).

In other illustrative embodiments, the rendered layout of the environment comprises an augmented reality image or a virtual reality image comprising QR codes associated with an object. For example, the object or objects can be lighting fixtures, light sources, mechanical fixtures, plumbing fixtures, furniture, or the like, or merchandise. In some embodiments, the QR code is accessible by the user to retrieve information about the object (e.g., merchandise sales data, equipment maintenance records, object identification, or the like). The merchandise sales data can be analyzed with respect to merchandise location, lighting, type, color, or any combination of physical attributes. The equipment maintenance records are analyzed with respect to equipment service lifetime, preventative maintenance, monitoring, proper operation, power cycling, or the like. The object identification can include manufacturer data, source data, procurement data, installation data, preventative maintenance data, replacement data, removal data, or the like.

In certain illustrative embodiments, the augmented reality image or the virtual reality image comprises a two-dimensional (2D) floor plan, a 2D wall plan, a 2D ceiling plan, a three-dimensional (3D) floor plan, a 3D wall image, a 3D ceiling image, or a 3D environment image. The augmented reality (AR) image or the virtual reality (VR) image can contain QR codes allowing the user to interact with the AR image or the VR image in real time.

In some embodiments, the memory contains instructions executable by the processor to further cause the server to continually update and refine the layout of the environment based on subsequent data received from the visual imaging system or user data received from the mobile device or from one or more other mobile devices associated with separate and different users within the given environment.

The present invention provides numerous advantages over current geolocation systems and methods. In particular, the system does not require known layouts or floor plans for geolocation. Rather, the system is able to automatically render a 2D or 3D layout or floor plan based on the identification of patterns of user movement and locations from user data collected by crowdsourcing techniques. Additionally, the system is able to allow a user to track equipment in a building, or merchandise in a retail environment. Furthermore, the use of crowdsourcing makes data more complete and up-to-date, as the system is configured to continually update a floor plan based on polling of multiple users within the space so as to further refine and improve accuracy of the generated layout or floor plan.

BRIEF DESCRIPTION OF THE DRAWINGS

Features and advantages of the claimed subject matter will be apparent from the following detailed description of embodiments consistent therewith, which description should be considered with reference to the accompanying drawings.

Figure 1:
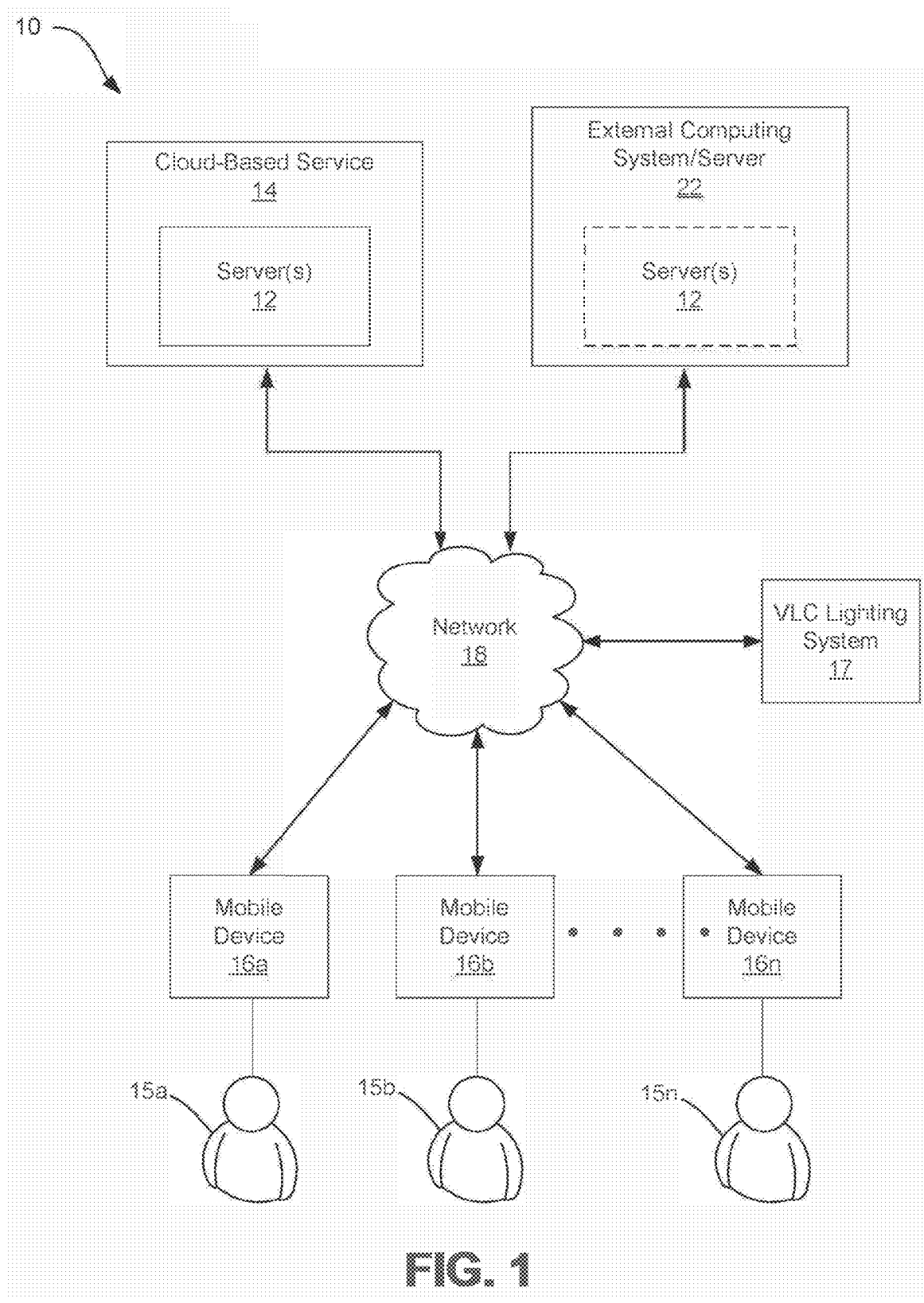
FIG. 1 is a block diagram illustrating one embodiment of an exemplary system for geolocation services in a mobile-based crowdsourcing platform.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present description provides systems and methods for providing interactive visual images in a mobile-based crowdsourcing platform. More specifically, the system of the present invention includes a plurality of remote mobile devices (e.g., smart phones) and a visual imaging system (e.g., security cameras) configured to communicate and exchange data with a cloud-based service, such as a crowdsourcing platform. The crowdsourcing platform generally provides a geolocation service based on the crowdsourcing, or polling, of users of the mobile devices, in addition to visual data captured by the visual imaging system, so as to determine location and movement of the users within a specific environment. The system is further configured to automatically render an augmented or virtual reality floor plan or layout of the specific environment based on the user data and visual data.

The location and movement of the users within the retail space may be based on user data as captured by one or more sensors on the mobile device, wherein such data includes, but is not limited to, user movement (e.g., GPS measurements, IMU measurements, etc.) as well as signals from the mobile device (e.g., received signal strength (RSS) measurements, RF measurements, etc.). In some embodiments, direct user input may be received (e.g., users be prompted to verify their location or movement, as well as specific landmarks or objects within the vicinity) so as to improve the degree of certainty of a user's position within the retail space.

The system is further configured to automatically map a floor plan or layout of a location based on the user data. For example, the system may include mapping/rendering software configured to identify patterns of user movement based on the user data, and, based on further confirmation from direct user input, render a floor plan of the retail space in which the users are located and moving. The system is configured to continually update a floor plan based on polling of multiple users within the retail space so as to further refine and improve accuracy of the generated floor plan.

In some embodiments, the system may utilize Visible Light Communication (VLC) to enable geolocation services within a particular environment (e.g., office space, retail space, service provider space, or the like), in addition, or alternatively, to utilizing sensor data collected from a user's mobile device. In particular, a system consistent with the present disclosure may include a VLC lighting system networked, or otherwise connected to, the crowdsourcing platform so as to communicate VLC data with the geolocation service of the crowdsourcing platform. The VLC data may be related to user location and movement, not only for the purpose of rendering and refining floor plans, but to further provide the location of a user with respect to any issues they may report within an environment, thereby automatically tying a user's report to an exact location. With regard to comfort issues, such as HVAC (e.g., temperature of a particular room within a building), the VLC data may enable a more accurate users' heat profile to optimize the use of thermal comfort data for controlling HVAC output within a given space.

The system is further configured to provide proximity sensing for determining the proximity of users relative to one another or relative to certain landmarks in a given location. This may be particularly useful in emergency situations. For example, knowing where users are in an emergency situation, such as a fire, could lead to potentially saving lives, as the system is configured to communicate specific alerts to users in the event that they are within the vicinity of an emergency. Similarly, the system may be aware of certain landmarks or objects that may be of importance in an emergency (e.g., fire extinguisher, nearest exit, medical devices such as defibrillators, etc.). Accordingly, a user in the vicinity of an emergency situation may be alerted to the nearest emergency exit or directed to a fire extinguisher or defibrillator. The present invention provides numerous advantages over current geolocation systems and methods. In particular, the system does not require known layouts or floor plans for geolocation. Rather, the system is able to automatically render a layout or floor plan based on the identification of patterns of user movement and locations from user data collected by crowdsourcing techniques. Additionally, the system is able to confirm, from direct user input, particular landmarks or spaces so as assist in the rendering of the layout or floor plan.

Furthermore, the use of crowdsourcing makes data more complete and up-to-date, as the system is configured to continually update a floor plan based on polling of multiple users within the space so as to further refine and improve accuracy of the generated layout or floor plan. The larger and more robust sets of data collected from crowdsourcing users further allows the deployment of self-learning algorithms, for example, which may result in improved accuracy in a rendered layout or floor plan. Furthermore, the configuration of the system of the present invention may reduce or even entirely eliminate the specific hardware requirements (e.g., beacon-like devices) that are required in current systems and methods.

FIG. 1 illustrates one embodiment of an exemplary system 10 consistent with the present disclosure. As shown, the system 10 includes a server 12 embodied on an internet-based computing system/service. For example, as shown, the server 12 may be embodied on a cloud-based service 14, for example. The server 12 is configured to communicate and share data with one or more users 15(1)-15(n) via user mobile devices 16(a)-16(n) over a network 18. In the present context, the users 15(1)-15(n) may include administrators, customers, or clients of a service provided to one or more remote users via the server 12. The users 15(1)-15(n) may also include particular persons to which the service is directed. The server 12 may further be configured to communicate and share data with a Visible Light Communication (VLC) lighting system 17 over the network 18, as will be described in greater detail herein.

For example, the server 12 may host a crowdsourcing platform for receiving user-driven data related to a particular environment in which users may be located, or otherwise reside, wherein such data may be useful to an owner of the space or for conveying useful information to users within the space. In the embodiments described herein, the server 12 hosts a crowdsourcing platform for providing a geolocation service. The server 12 is configured to receive user-driven data for use in the automatic mapping of a layout or floor plan of an environment in which the users are located and moving within. In examples described in greater detail, the environment may include an indoor environment within a building or other structure, such that floor plans of the building may be generated based on user data. It should be noted that the system consistent with the present disclosure may be used for the mapping and generation of a layout of an outdoor environment and is not limited to geolocation services for an indoor environment.

Yet still, the geolocation service of the present invention may further be useful in building maintenance, wherein the server is configured to collect data from patrons or employees within a space, such as a retail space, wherein such data may be related to comfort issues such as HVAC (e.g., temperature of a particular room within a building), building maintenance issues (e.g., lighting issues, cleanliness of facilities, etc.), as well as other aspects of a building or space that may be useful in management of such space. Accordingly, the system of the present invention may be useful with the crowdsourcing platform as described in co-pending and co-owned U.S. patent application Ser. No. 14/328,492, filed Jul. 10, 2014, the contents of which are incorporated herein by reference in their entirety.

In addition, or alternatively, to user-driven data received from smartphones, or other mobile devices, the server 12 may receive data from other connected systems, which can essentially assist in, not only the rendering of floor plans, but also the mapping of traffic patterns within a space, as well as providing an additional level of user report aggregation and mapping. For example, the VLC lighting system 17 may be networked, or otherwise connected to, the server 12 so as to communicate VLC data with the geolocation service of the crowdsourcing platform. The VLC data may be related to user location and movement, not only for the purpose of rendering and refining floor plans, but to further provide the location of a user with respect to any issues they may report within an environment, thereby automatically tying a user's report to an exact location. With regard to comfort issues, such as HVAC (e.g., temperature of a particular room within a building), the VLC data may enable a more accurate users' heat profile to optimize the use of thermal comfort data for controlling HVAC output within a given space. The system 10 may further include an external computing system/server 22 configured to communicate with at least the cloud-based service 14, and subsequently the server 12, via the network 18. The external computing system/server 20 may be embodied as a remote server, for example, for communicating with the server 12 and for performing the other functions described herein. Similarly, in some embodiments, the server 12 may be embodied on the external computing system/server 22. In the embodiments described herein, the external computing system/server 20 may be embodied as a remote server having one or more databases associated with the server 12, as will be described in greater detail herein.

The network 18 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the mobile devices 16, between the mobile devices 16 and the cloud-based service 14 and/or the external computing device/system/server 22, may be, in whole or in part, a wired connection.

The network 18 may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), the most recently published versions of IEEE 802.11 transmission protocol standards as of June 2015, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

As shown, in an aspect of the present invention, data and other information and services are, for example, input by one or more users 15 (shown as users 15a-15n) and received by one or more associated mobile devices 16 (shown as mobile devices 16a-16n). The mobile devices 16 are configured to be communicatively coupled to the cloud-based service 14 and/or external device, system or server 22 via the network 18. In addition, or alternatively, the mobile devices 16 are configured to be communicatively coupled to one another via the network 18. In some embodiments, user data may be passively transmitted to the server 12 (e.g., data captured by one or more sensors on the mobile device 16 may be automatically transmitted to the server 12). The server 12 is configured to communicate and share data with the mobile devices 16 associated with one or more users 15. Accordingly, the mobile device 16 may be embodied as any type of device for communicating with the server 12 and cloud-based service 14, and/or other user devices over the network 18. For example, at least one of the user devices may be embodied as, without limitation, a computer, a desktop computer, a personal computer (PC), a tablet computer, a laptop computer, a notebook computer, a mobile computing device, a smart phone, a drone, a security camera, a cellular telephone, a handset, a messaging device, a work station, a distributed computing system, a multiprocessor system, a processor-based system, and/or any other computing device configured to store and access data, and/or to execute software and related applications consistent with the present disclosure. In the embodiments described here, the mobile device 16 is generally embodied as a smartphone having one or more sensors for capturing various data related to at least one of user movement, user location, signals outputted from or received by the mobile device 16, and the like.

The VLC lighting system 17 may generally include a set of interconnected illumination sources (i.e., lighting, such as Light Emitting Diodes (LEDs)) positioned within a space or environment, such as retail space within a building. In addition to providing illumination within a given space, the LEDs are further configured to create a "smart" indoor environment, in that the LED light bulbs generally provide a foundation for networking using visible light as communication medium. Visible light communication (VLC) technology is a data communications medium which uses visible light between 400 and 800 THz. VLC is generally is based on the principle that, since it is possible to turn an LED on and off much faster than the human eye can resolve, lights can be used to transmit binary data in the form of light pulses without any detectable flickering. Accordingly, this functionality of LEDs allows LED lighting to be used for high-speed data transfer. The general background of VLC technology and the common components for allowing VLC with LEDs is described in "Visible Light Communication, Networking and Sensing: A Survey, Potential and Challenges", P. H. Pathak, X. Feng, P. Hu, P. Mohapatra, DOI 10.1109/COMST.2015.2476474, IEEE Communications Surveys & Tutorials, the content of which is incorporated by reference herein in its entirety.

Accordingly, the VLC lighting system 17 may include LED light bulbs installed within a space and configured to, not only provide illumination with the space, but to further capture VLC data associated with one or more users within the space. The VLC lighting system 17 is further configured to communicate with and transmit such VLC data to the server 12. The VLC data may generally include user location and movement, not only for the purpose of rendering and refining floor plans, but to further provide the location of a user with respect to any issues they may report within an environment, thereby automatically tying a user's report to an exact location. With regard to comfort issues, such as HVAC (e.g., temperature of a particular room within a building), the VLC data may enable a more accurate users' heat profile to optimize the use of thermal comfort data for controlling HVAC output within a given space.

Figure 2:
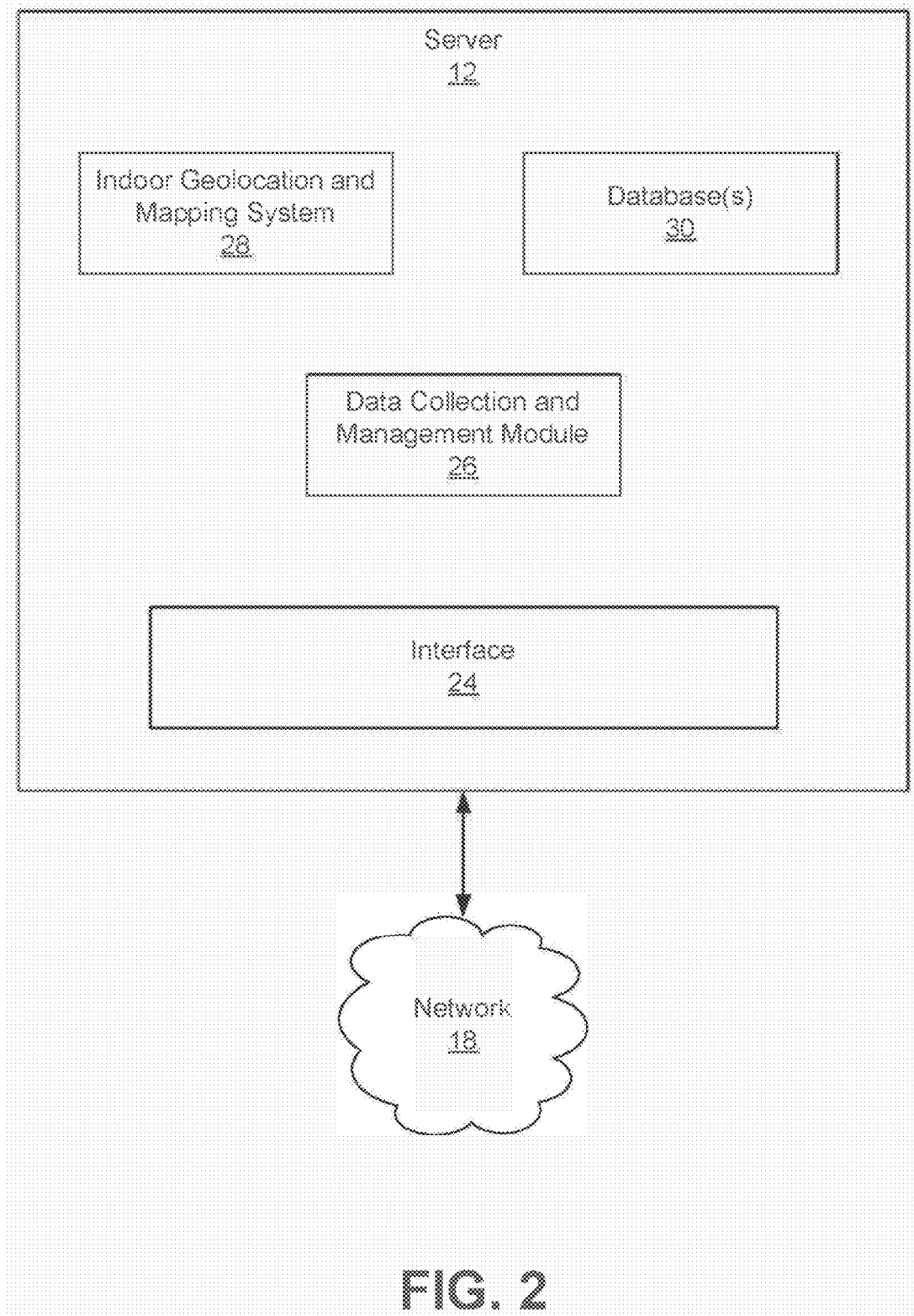
FIG. 2 is a block diagram illustrating the server of FIG. 1 in greater detail.

FIG. 2 is a block diagram illustrating the server 12 in greater detail. As shown, the server 12 may include an interface 24, a data collection and management module 26, an indoor geolocation and mapping system 28, and one or more databases 30 for data related data received from the mobile devices 16. For example, the data collection and management module 26 may be configured to communicate and exchange data with at least the indoor geolocation and mapping system 28 and one or more databases 30, each of which is described in greater detail herein.

The interface 24 may generally allow a user (e.g., an authorized user 15) to access data on the server 12. For example, upon accessing the server 12 on the cloud-based service 14, the interface 24 may be presented to the user via their device 16, in which the user may navigate a dashboard or standard platform interface so as to access data (stored in the databases 30) collected from other users and their associated mobile devices. For example, in the event that the service provided is the crowdsourcing platform for geolocation services, certain users may access the data collected from users within the environment being mapped, as well as the specific floor plans or layouts rendered based on the user data.

Figure 3:
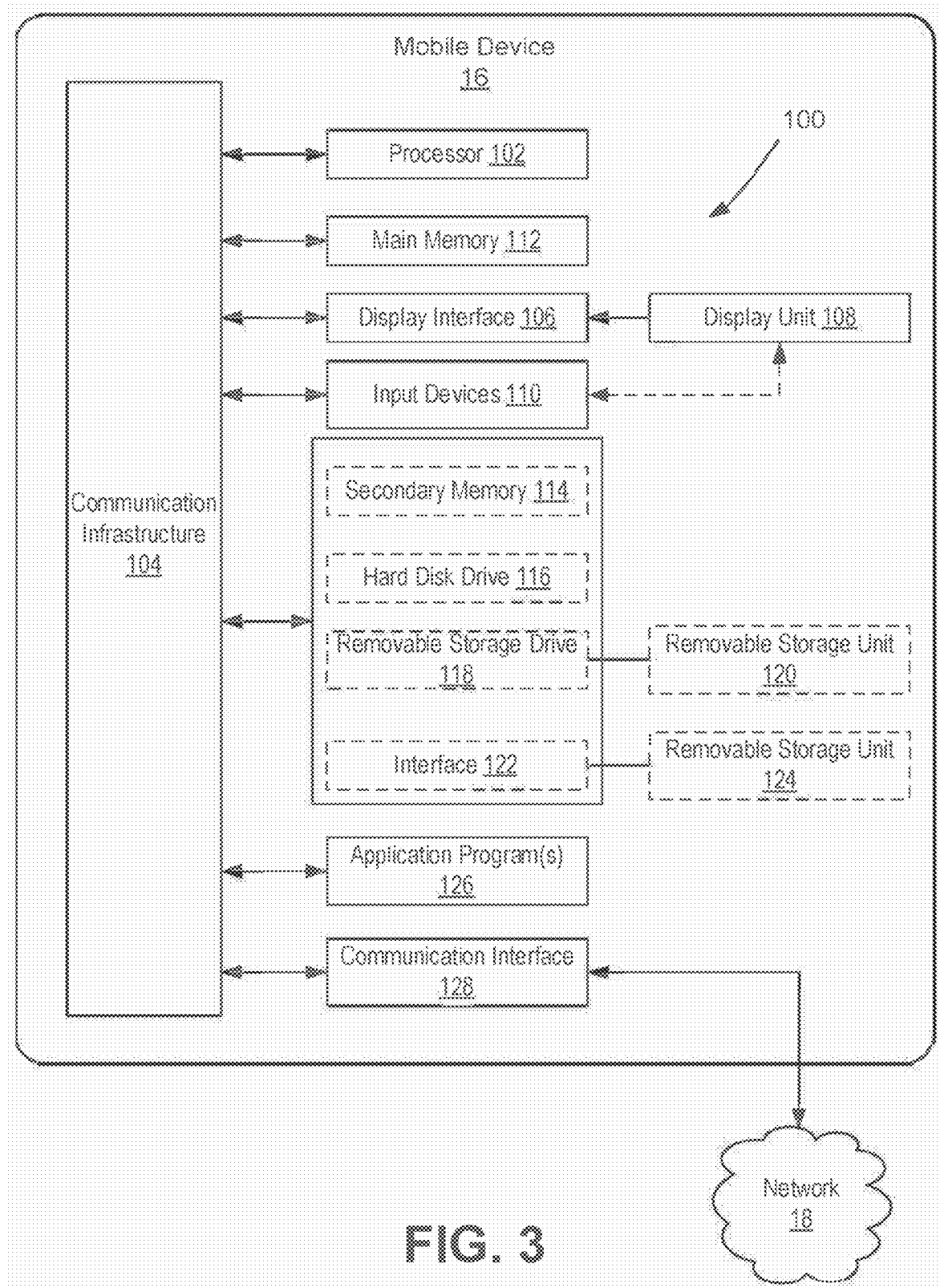
FIG. 3 is a block diagram illustrating at least one embodiment of a mobile device for providing user data related to user location and/or movement consistent with the present disclosure.

FIG. 3 is a block diagram illustrating at least one embodiment of a mobile device 16 for providing user data related to user location and/or movement consistent with the present disclosure. The mobile device 16 generally includes a computing system 100. As shown, the computing system 100 includes one or more processors, such as processor 102. Processor 102 is operably connected to communication infrastructure 104 (e.g., a communications bus, cross-over bar, or network). The processor 102 may be embodied as any type of processor capable of performing the functions described herein. For example, the processor may be embodied as a single or multi-core processor(s), digital signal processor, microcontroller, or other processor or processing/controlling circuit.

The computing system 100 further includes a display interface 106 that forwards graphics, text, sounds, and other data from communication infrastructure 104 (or from a frame buffer not shown) for display on display unit 108. The computing system further includes input devices 110. The input devices 110 may include one or more devices for interacting with the mobile device 16, such as a keypad, microphone, camera, as well as other input components, including motion sensors, and the like. In one embodiment, the display unit 108 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 16, such as accessing and interacting with applications executed on the device 16, including an app for providing direct user input with the geolocation service offered by a crowdsourcing platform.

The computing system 100 further includes main memory 112, such as random access memory (RAM), and may also include secondary memory 114. The main memory 112 and secondary memory 114 may be embodied as any type of device or devices configured for short-term or long-term storage of data such as, for example, memory devices and circuits, memory cards, hard disk drives, solid-state drives, or other data storage devices. Similarly, the memory 112, 114 may be embodied as any type of volatile or non-volatile memory or data storage capable of performing the functions described herein.

In the illustrative embodiment, the mobile device 16 may maintain one or more application programs, databases, media and/or other information in the main and/or secondary memory 112, 114. The secondary memory 114 may include, for example, a hard disk drive 116 and/or removable storage drive 118, representing a floppy disk drive, a magnetic tape drive, an optical disk drive, etc. Removable storage drive 118 reads from and/or writes to removable storage unit 120 in any known manner. The removable storage unit 120 may represents a floppy disk, magnetic tape, optical disk, etc. which is read by and written to by removable storage drive 118. As will be appreciated, removable storage unit 120 includes a computer usable storage medium having stored therein computer software and/or data.

In alternative embodiments, the secondary memory 114 may include other similar devices for allowing computer programs or other instructions to be loaded into the computing system 100. Such devices may include, for example, a removable storage unit 124 and interface 122. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 122, which allow software and data to be transferred from removable storage unit 124 to the computing system 100.

The computing system 100 further includes one or more application programs 126 directly stored thereon. The application program(s) 126 may include any number of different software application programs, each configured to execute a specific task.

The computing system 100 further includes a communications interface 128. The communications interface 128 may be embodied as any communication circuit, device, or collection thereof, capable of enabling communications between the mobile device 16 external devices (other mobile devices 16, the cloud-based service 14, and the external computing system/server 22). The communications interface 128 may be configured to use any one or more communication technology and associated protocols, as described above, to effect such communication. For example, the communications interface 128 may be configured to communicate and exchange data with the server 12, the external computing system/server 22 and/or one other mobile device 16 via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards as of June 2015, and a combination thereof. Examples of communications interface 228 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 112 and/or secondary memory 114 or a local database on the mobile device 16. Computer programs may also be received via communications interface 128. Such computer programs, when executed, enable the computing system 100 to perform the features of the present invention, as discussed herein. In particular, the computer programs, including application programs 126, when executed, enable processor 102 to perform the features of the present invention. Accordingly, such computer programs represent controllers of computer system 100.

In one embodiment where the invention is implemented using software, the software may be stored in a computer program product and loaded into the computing system 100 using removable storage drive 118, hard drive 116 or communications interface 128. The control logic (software), when executed by processor 102, causes processor 102 to perform the functions of the invention as described herein.

In another embodiment, the invention is implemented primarily in hardware using, for example, hardware components such as application specific integrated circuits (ASICs).

Implementation of the hardware state machine so as to perform the functions described herein will be apparent to persons skilled in the relevant art(s).

In yet another embodiment, the invention is implemented using a combination of both hardware and software.

Figure 4:
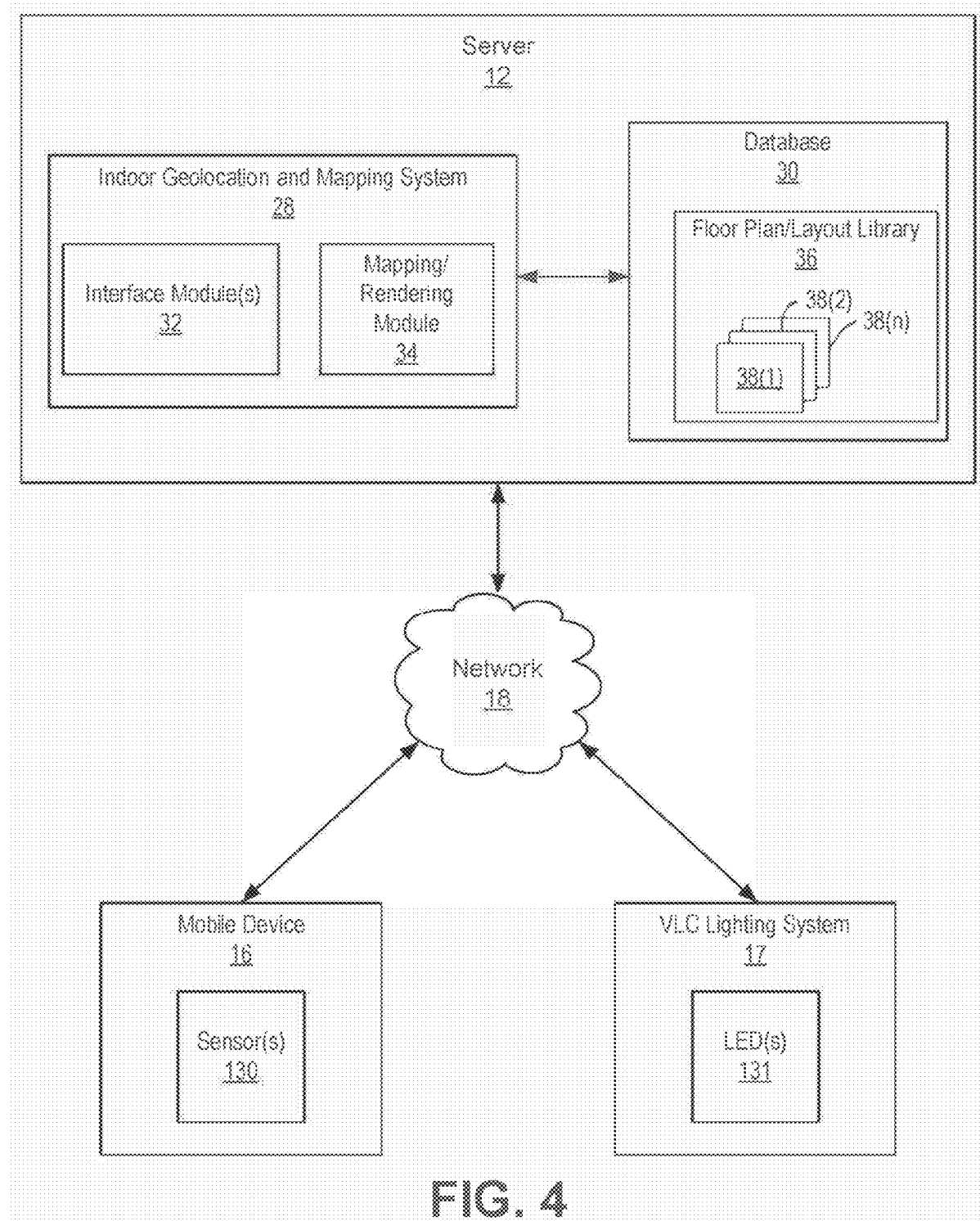
FIG. 4 is a block diagram illustrating the indoor geolocation and mapping system provided by a server consistent with the present disclosure in greater detail.

FIG. 4 is a block diagram illustrating the indoor geolocation and mapping system 28 in greater detail. As shown, the geolocation and mapping system 28 may include one or more interface modules 32 and a mapping/rendering module 34. As will be described in greater detail herein, the geolocation and mapping system (by way of modules 32 and 34) is configured to receive the user data from the mobile device 16 related to user location and/or movement within an environment, as well as data from the VLC lighting system 17, and further render a floor plan or layout based on the user and/or VLC data. Accordingly, the geolocation and mapping system 28 is configured to communicate with a floor plan/layout library 36 storing one or more floor plan/layout profiles 38(1)-38(n). In the event that an environment is being mapped for the first time, a new profile 38 is created. However, due to the nature of crowdsourcing, in which users may be continually polled at regular intervals, the geolocation and mapping system 28 may gain access to an existing profile 38 and update an existing floor plan or layout based on additional user data so as to further refine and improve accuracy of the generated floor plan or layout. The one or more interface modules 32 are generally configured to receive sensor data captured by one or more sensors 130 of the mobile device 16, and/or VLC data associated with one or more LEDs 131 of the VLC lighting system 17. Upon analyzing the sensor/VLC data, the one or more interface modules 32 are configured to generate and transfer user position/movement data to the mapping/rendering module 34. The mapping/rendering module 34 is configured to process the user position/movement data and generate, or render, a floor plan or layout, as will be described in greater detail herein.

Figure 5:
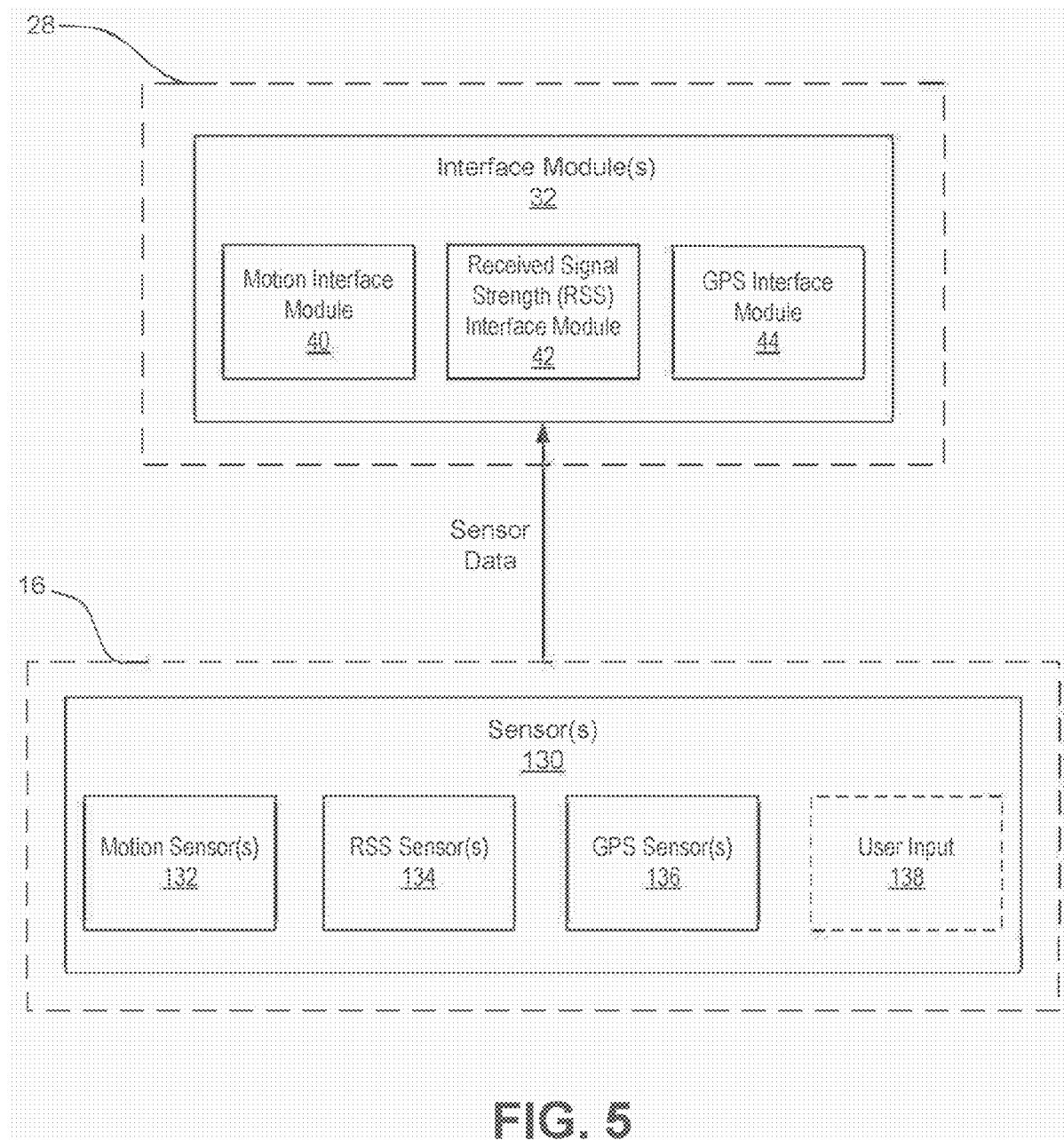
FIG. 5 is a block diagram illustrating collection of user data from one or more sensors of a mobile device and subsequent analysis of such data by interface modules of the indoor geolocation and mapping system.

FIG. 5 is a block diagram illustrating collection of sensor data captured by one or more sensors 130 of the mobile device 16 and subsequent analysis of such data by interface modules 32 of the indoor geolocation and mapping system 28. As shown, the mobile device 16 may include a variety of different sensors configured to capture data related to motion or position of the mobile device 16 and/or signals either transmitted from or to the mobile device 16. The sensors 130 may further be configured to capture user input, such as touch input and the like. As shown, the sensors 130 may include one or more motion sensors 132, a received signal strength (RSS) sensor 134, and a GPS sensor 136.

It should be noted that FIG. 5 illustrates one embodiment of set of sensors included in a mobile device consistent with the present disclosure and by no means is meant to limit the kind and/or amount of sensors for use in a system and/or method consistent with the present disclosure. For example, a system and method consistent with the present disclosure may include more or less sensors than what is illustrated in FIG. 5.

The one or more motion sensors 132 may be embodied as any type of sensor configured to capture motion data and produce sensory signals from which the geolocation and mapping system 28 may determine the user position and/or movement with the mobile device 16. In particular, the motion sensor 132 may be configured to capture data corresponding to the movement of the user device 132 or lack thereof. The motion sensor 132 may include, for example, an accelerometer, an altimeter, one or more gyroscopes, or other motion or movement sensor to produce sensory signals corresponding to motion or movement of the device 16 and/or a magnetometer to produce sensory signals from which direction of travel or orientation can be determined. The one or more motion sensors 132 may further include, or be coupled to, an inertial measurement unit (IMU) for example.

The motion sensors 132 may also be embodied as a combination of sensors, each of which is configured to capture a specific characteristic of the motion of the device 16, or a specific characteristic of user movement. A motion sensor embodied as a combination of sensors may use algorithms, such as, for example, fusion algorithms, to correct and compensate the data from individual sensors and provide more robust motion sensing and detection context than each individual sensor can provide alone.

The RSS sensor 134 is generally configured to capture signal strength of the mobile device 16, which may be used to determine the distance between stations, as signal strength is usually related to the distance via a path-loss model which predicts the received signal strength at any specific distance based on the transmit power, signal attenuation gradient (known as path-loss exponent), number of attenuators and their respective attenuation level, and the distance to the stations. The GPS sensor 136 is configured to capture location data (e.g. coordinates) of the mobile device 16. In some embodiments, a system clock may be used and configured to determine date and time of day of the user device 16, wherein such data may be transmitted to the geolocation and mapping system 28.

As shown, the geolocation and mapping system 28 includes interface modules 32 configured to process and analyze data captured from corresponding sensors 130 to determine user position or movement based on analysis of the captured data. In the illustrated embodiment, the geolocation and mapping system 28 includes a motion interface module 40 configured to receive and analyze data captured by the one or more motions sensors 132, a RSS interface module 42 configured to receive and analyze data captured by the RSS sensor 134, and a GPS interface module 44 configured to receive and analyze data captured by the GPS sensor 136. The motion interface module 40 is configured to receive motion data captured by the one or more motion sensors 132. Upon receiving the motion data from the one or more motion sensors 132, the motion interface module 40 may be configured to identify movement of the device 16 such as, for example, the direction of movement, location of the device 16 within a particular plot, magnitude of movement of the device 16, which may indicate user location/movement when combined with analyzing of RSS data and GPS data by the RSS and GPS interface modules 42, 44. The motion interface module 40 may include custom, proprietary, known and/or after-developed motion detection code (or instruction sets) that are generally well-defined and operable to identify a motion event.

As previously described, in some embodiments, direct user input may be received (e.g., users be prompted to verify their location or movement, as well as specific landmarks or objects within the vicinity) so as to improve the degree of certainty of a user's position or movement within a space.

The mapping system 28 may further include additional components configured to be operably associated with the VLC lighting system 17 so as to receive, process, and analyze VLC data captured and provided thereto from the VLC lighting system 17. For example, the VLC technology provided by the VLC lighting system 17 of the present disclosure could provide an exact location of a user as they are walking through a building or within retail space.

Accordingly, the benefits of such VLC data include combining the VLC data with the user-driven data captured by one or more sensors in the user's mobile device, thereby resulting in a robust set of location and movement data, further resulting in improved floor layout rendering or mapping. The crowdsourcing platform can use the VLC data for other purposes, including locating users' reports, enabling more accurate user polling based on their accurate location, thereby aiding in increasing social engagement of users based on their location, enabling more accurate users' heat profiles to optimize the use of thermal comfort data, enabling more accurate locating of any reported issues within the space. The VLC data can further be used for analytics of geo-positioned data. For example, such benefits include energy savings per zone via thermal reporting, as well as improved prediction of potential issues and problematic zones.

Figure 6:
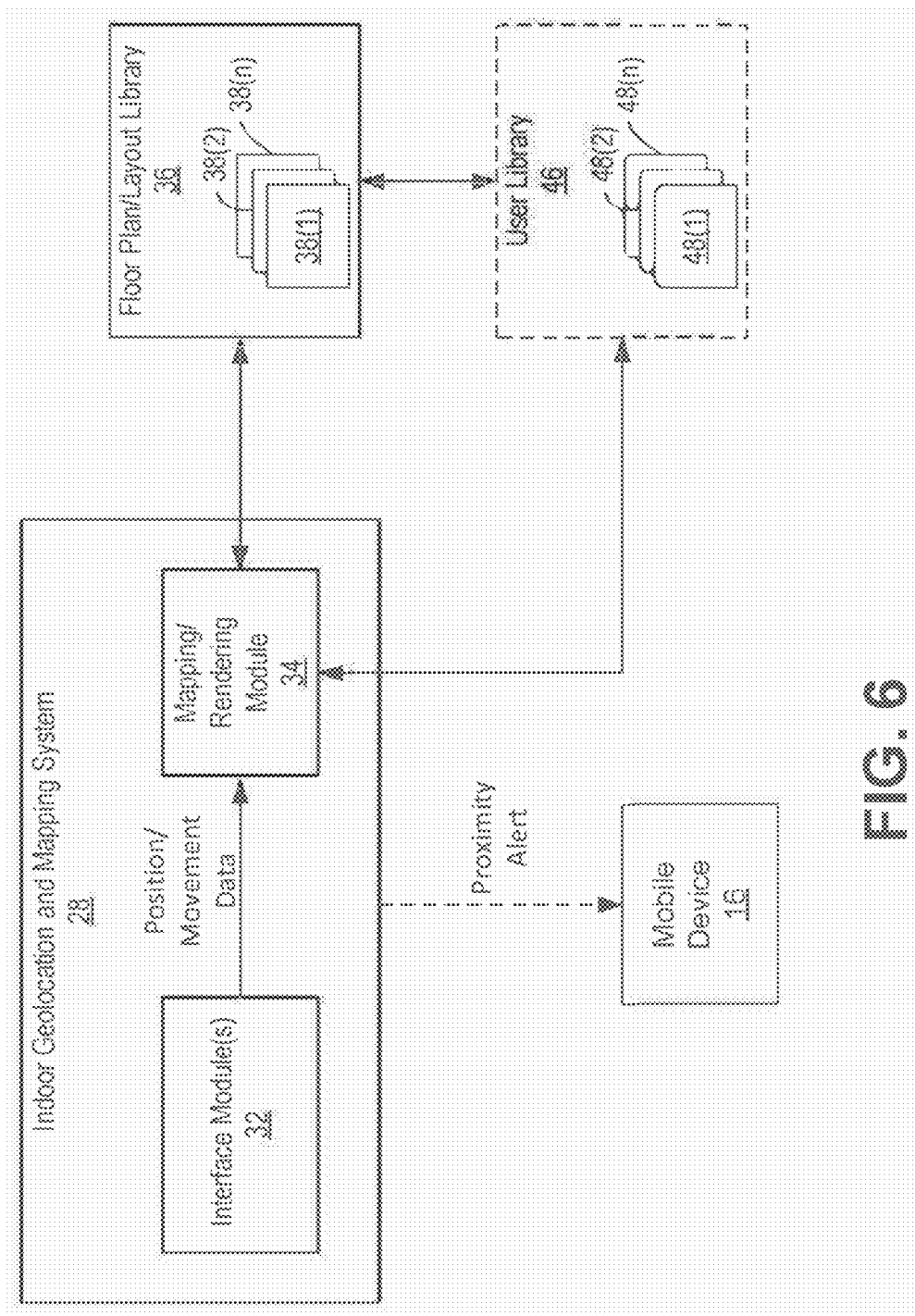
FIG. 6 is a block diagram illustrating communication between the indoor geolocation and mapping system and floor plan/layout library and the mobile device.

FIG. 6 is a block diagram illustrating communication between the indoor geolocation and mapping system 28, floor plan/layout library 36, and the mobile device 16. Upon analyzing the sensor data, the one or more interface modules 32 are configured to generate and transfer user position/movement data to the mapping/rendering module 34 for subsequent rendering of a floor plan or layout to be saved in a profile 38 of the library 36. In particular, the mapping/rendering module 34 may include custom, proprietary, known and/or after-developed data and graphics code (or instruction sets, functions, etc.) that are generally well-defined and operable to receive the position/movement data from the interface modules 32 and generate a visual model of a floor plan or layout of the space in which a user is located. The mapping/rendering module 34 may further be configured to identify patterns of user movement based on the position/movement data, and, based on further confirmation from direct user input, render a floor plan or layout.

The mapping/rendering module 34 is configured to continually update a floor plan or layout based on polling of multiple users within the space so as to further refine and improve accuracy of the generated floor plan or layout. For example, the system may be configured to communicate with a user via their mobile device and prompt the user to provide an indication as to their current location within a given space. The user input may then be used with the sensor data to confirm or improve rendering of a floor plan or layout.

In some embodiments, the system is further configured to provide proximity sensing for determining the proximity of users relative to one another or relative to certain landmarks in a given location. This may be particularly useful in emergency situations. For example, in addition to receiving sensor data, the geolocation and mapping system 28 may be configured to receive user input tied to the sensor data, such that the system can assign a user's identity or an identity of the mobile device 16 to specific position/movement data so as to track a location of a user at any given moment. Thus, each user may include a profile 48(1)-48(n) stored within a user library 46, wherein the profile 48 may include specifics about a user (e.g., user characteristics, user settings for the service, etc.) as well as a current or last known position of the user within a given floor plan or layout. The system may utilize the location of a user for purposes of providing a communication alert to the user's mobile device 16, which may be particularly useful in certain situations, such as emergency situations. For example, the system is configured to communicate specific alerts to users in the event that they are within the vicinity of an emergency. Similarly, the system may be aware of certain landmarks or objects that may be of importance in an emergency (e.g., fire extinguisher, nearest exit, medical devices such as defibrillators, etc.). Accordingly, a user in the vicinity of an emergency situation may be alerted to the nearest emergency exit or directed to a fire extinguisher or defibrillator.

FIGS. 7-15 disclose another embodiment of the present disclosure. The floor plans and mapping modules of the present disclosure can also be used on ceilings and walls (i.e., ceiling and wall plans, ceiling and wall image augmented reality (AR), or ceiling and wall virtual reality (VR)). The ceilings may have lights and light fixtures that need monitoring and can provide information as to location and whether the lights are operating properly.

In some embodiments, the mobile device is a tablet computer, a laptop computer, a notebook computer, a mobile computing device, a smart phone, or a cellular telephone, and the visual imaging system comprises a security camera, a drone, or a smart phone. In certain embodiments, the server and at least one of the mobile device and the visual imaging system are configured to wirelessly communicate and exchange data with one another over a network (e.g., Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, and Near Field Communication (NFC)). In some embodiments, the communication and exchange of data between the server and at least one of the mobile device and the visual imaging system is provided via a cloud-based service.

Figure 7:
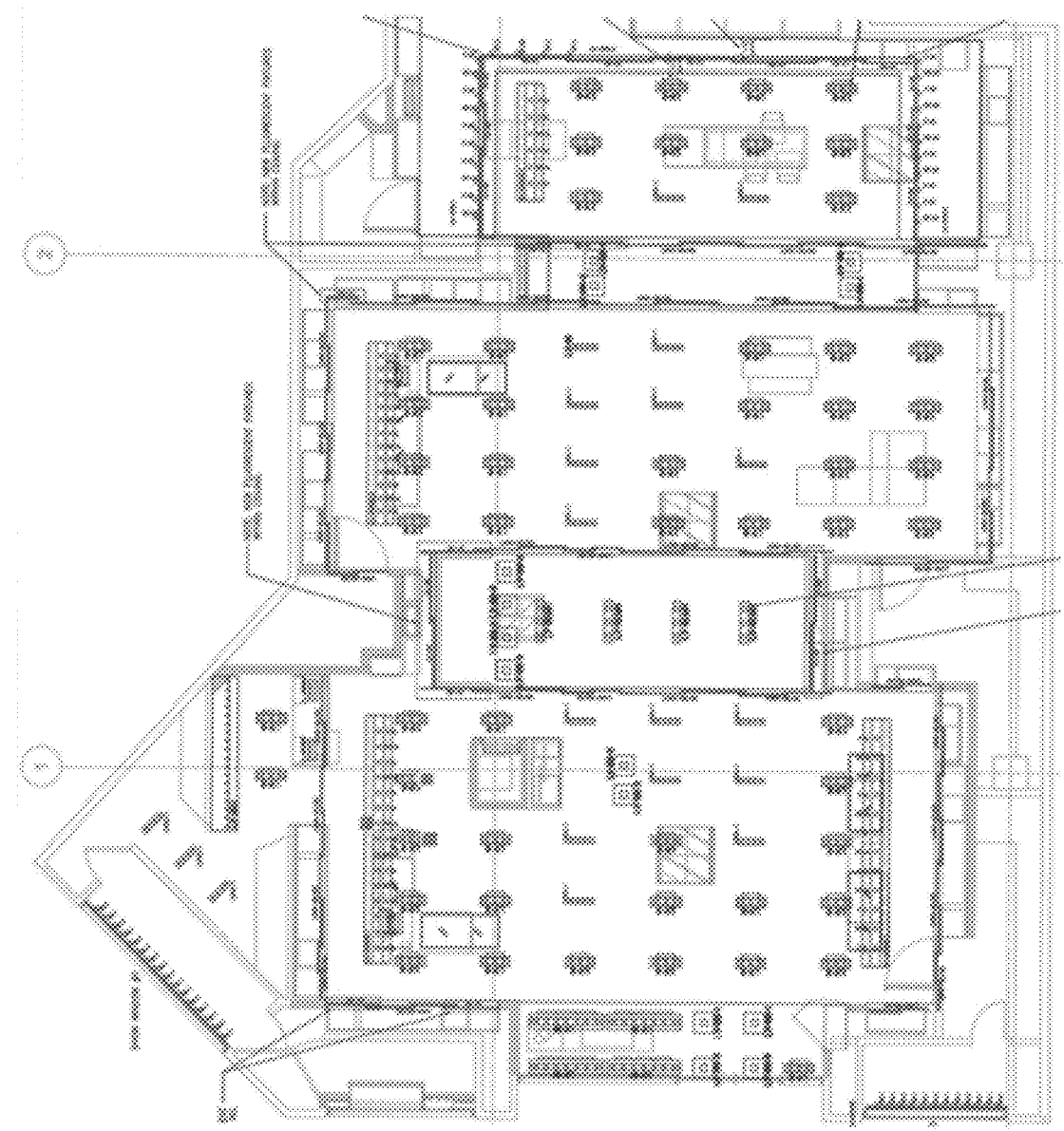
FIGS. 7 and 8 are exemplary floor plans according to an embodiment described herein.
Figure 8:
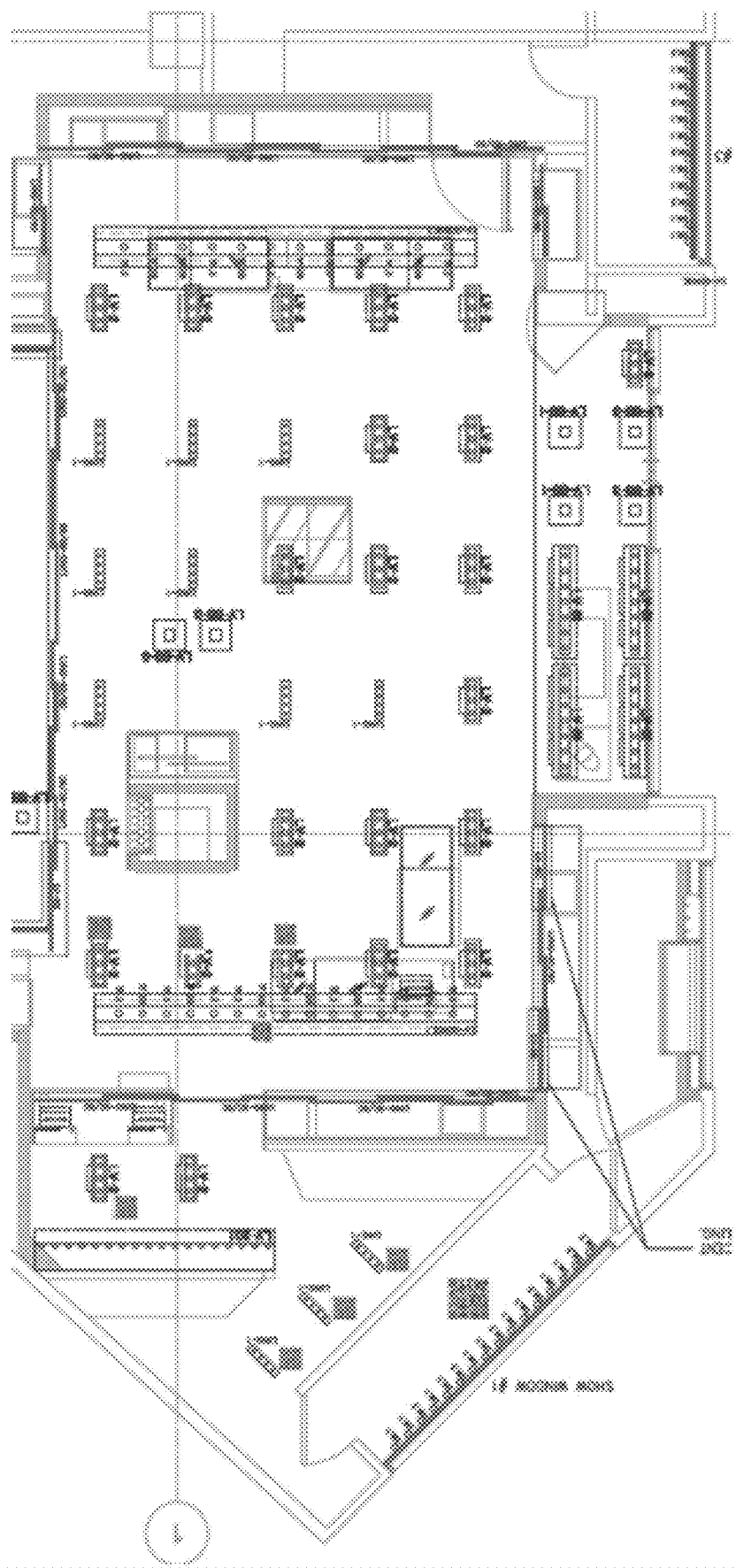
Figure 9:
FIG. 9 is a digital image showing a retail space that can be augmented with geolocation and mapping systems according to the present disclosure.
Figure 10:
FIG. 10 is a digital image showing a first retail space that is virtually supplemented by QR codes.
Figure 11:
FIG. 11 is a digital image showing a second retail space that is virtually supplemented by QR codes.
Figure 12:
FIG. 12 is a digital image showing a third retail space that is virtually supplemented by QR codes.
Figure 13:
FIG. 13 is a digital image showing a fourth retail space that is virtually supplemented by QR codes.
Figure 14:
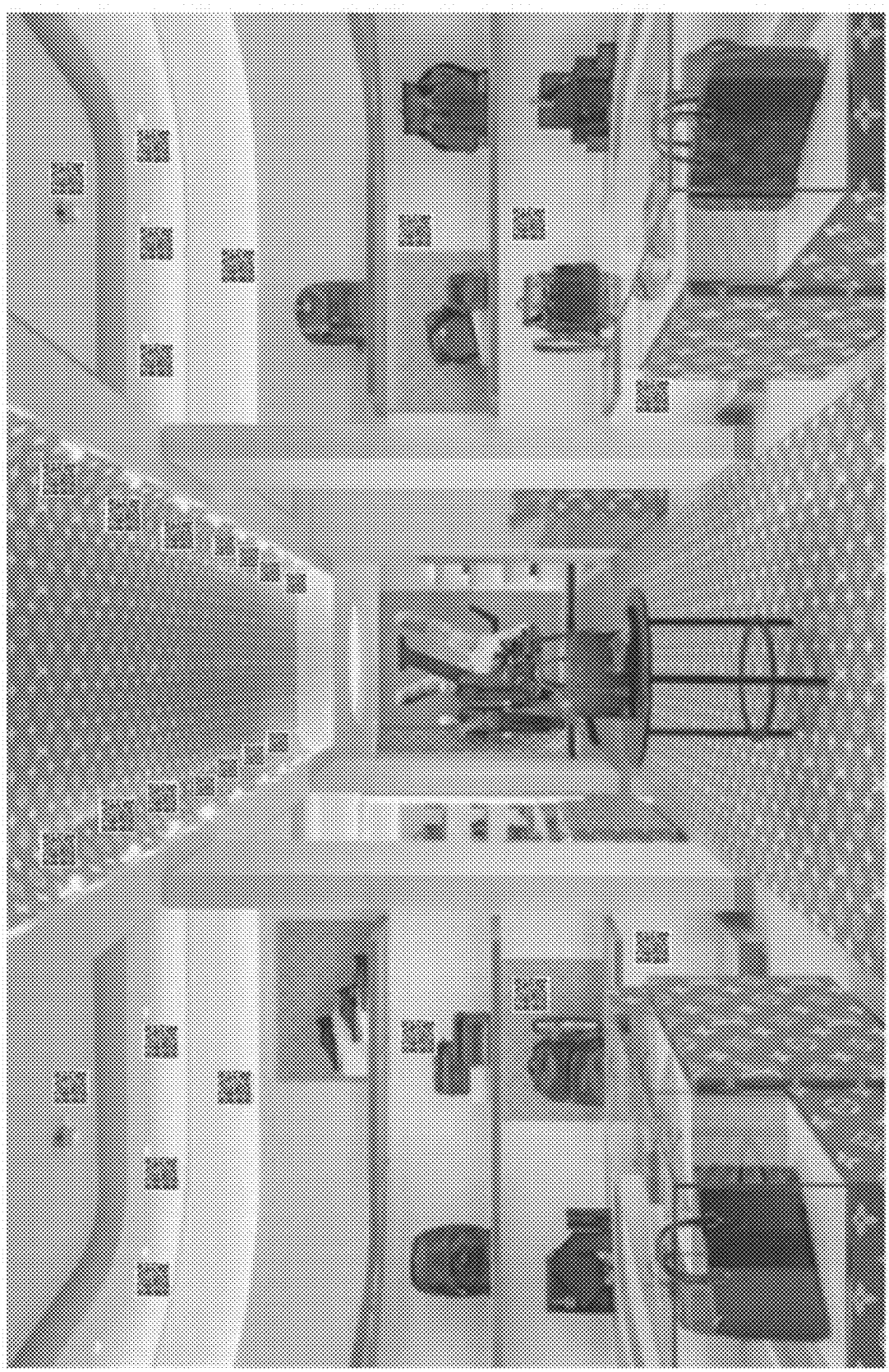
FIG. 14 is a digital image showing a fifth retail space that is virtually supplemented by QR codes.
Figure 15:
FIG. 15 is a digital image showing a sixth retail space that is virtually supplemented by QR codes.

FIGS. 7 and 8 schematically show floor plans representing an environment (e.g., a retail space, an office space, a service provider's space, or the like) that can be rendered by the system. The system is able to adapt to any changes in the environment (e.g., in a retail space) such as movement of merchandise racks, display cases, cashier stations, or the like. Additionally, the system can track crowd movement through the space so that bottlenecks can be resolved and dead spaces can be reworked to alleviate bottlenecks by increasing pedestrian traffic in lesser used areas. In some embodiments, restroom traffic and/or spills can be tracked and a signal can be generated by the system directing sanitation workers to needed areas. Accordingly, safety hazards can be avoided or attended to quickly avoiding injury to a person in the environment.

In other illustrative embodiments, the rendered layout of the environment includes the aforementioned AR or VR image containing QR codes associated with an object. For example, the object or objects can be lighting fixtures, light sources, mechanical fixtures, plumbing fixtures, furniture, or the like, or merchandise. In some embodiments, the QR code is accessible by the user to retrieve information about the object (e.g., merchandise sales data, equipment maintenance records, object identification, or the like). The merchandise sales data can be analyzed with respect to merchandise location, lighting, type, color, or any combination of physical attributes. The equipment maintenance records are analyzed with respect to equipment service lifetime, preventative maintenance, monitoring (e.g., negligence), proper operation, power cycling (e.g., wear & tear), or the like. The object identification can include manufacturer data, source data, procurement data, installation data, preventative maintenance data, replacement data, removal data (e.g., obsolete and/or sold), or the like.

In certain embodiments, the environment may be a retail space. The retail space can be outfitted with merchandise such as handbags, briefcases, clothing, jewelry, appliances and other such merchandise or inventory that is otherwise accounted for by a purveyor of merchandise. Pursuant to the present disclosure, AR or VR images (including 2D or 3D imagery) of environment can be embedded with QR codes or other user data or VLC data. For example, the AR or VR images can be a two-dimensional (2D) floor plan, a 2D wall plan, a 2D ceiling plan, a three-dimensional (3D) floor plan, a 3D wall image, a 3D ceiling image, or a 3D environment image. The augmented reality (AR) image or the virtual reality (VR) image can contain QR codes allowing the user to interact with the AR image or the VR image in real time. These images could be a virtual image that ties to a specific light, light fixture, or article of merchandise. These images could be altered to include these lights, light fixtures or articles of merchandise by way of augmented reality or automated image recognition (e.g., an image of all lights on and working compared to an image where one or more lights are off or not working). As shown in FIGS. 8-15, these images could be virtually supplemented by QR codes, and the QR codes can be input to the user application for their use and control. In some embodiments, these results can be tied to the lighting system to track lighting malfunctions and signal a need to replace a light or light fixture. In other examples, the results can be tied to the merchandise or inventory systems to provide a user with information about sales, shoplifting, thefts, or a need to order or replenish supplies (e.g., maintenance supplies and/or merchandise).

Sales information, including product type, color, size, and the like, can be used to maintain sales and properly stock a retail space. In some examples, product placement in the retail space can be analyzed to determine whether certain areas of the retail space are more conducive to moving product. These results would enable retail management to tweak the space to improve the customer experience and sales. The results can track how lighting affects sales. For example, some products may sell better in natural light where some other products sell better in artificial light.

Additionally, the results provided by the system can be used at the corporate level of a retail chain, for example, to target particular markets or to ensure consistency across a brand. For example, market targeting can include tracking merchandise sales in a particular area and loading retail space in that area with popular and similar or complementary merchandise. Also, the system can be used to provide comfort for visitors to a location different than a usual location. Thus, the visitor will know the new space as well as their regular space and enjoy the experience.

The present invention provides numerous advantages over current geolocation systems and methods. In particular, the system does not require known layouts or floor plans for geolocation. Rather, the system is able to automatically render a layout or floor plan based on the identification of patterns of user movement and locations from user data collected by crowdsourcing techniques. Additionally, the system is able to confirm, from direct user input, particular landmarks or spaces so as assist in the rendering of the layout or floor plan.

Furthermore, the use of crowdsourcing makes data more complete and up-to-date, as the system is configured to continually update a floor plan based on polling of multiple users within the space so as to further refine and improve accuracy of the generated layout or floor plan. The larger and more robust sets of data collected from crowdsourcing users further allows the deployment of self-learning algorithms, for example, which may result in improved accuracy in a rendered layout or floor plan. Furthermore, the configuration of the system of the present invention may reduce, or even entirely eliminate, the specific hardware requirements (e.g., beacon-like devices) that are required in current systems and methods.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), rewritable compact disks (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions.

Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system for providing interactive visual images in a mobile-based crowdsourcing platform, the system comprising:
a server system configured to communicate with and exchange data with a mobile device, a merchandise or inventory system, and a visual imaging system, the server comprising at least one processor coupled to at least one memory containing instructions executable by the at least one processor to cause the server system to:
receive visual image data from the visual imaging system, the visual image data associated with an environment;
identify, from the visual image data, a merchandise object associated with the environment;
analyze, from the visual image data, lighting within the environment including natural and artificial lighting;
analyze merchandise sales data from the merchandise or inventory system to produce an analysis of how the natural and artificial lighting within the environment affects sales of the merchandise object;
receive user data from the mobile device, the user data associated with at least one of a location of a user and movement of the user within the environment over a period of time;
prompt the user for verification of location and landmarks including at least the merchandise object; and
render a layout of the environment on the mobile device based on the user data and visual image data, wherein rendering comprises generating a visual model of a layout of the environment in which the user is located or moving to provide an altered reality wherein the user can track information related to the environment, the rendered layout of the environment comprising an augmented reality image or a virtual reality image comprising a QR code accessible by the user to retrieve information about the merchandise object including the analysis of how the natural and artificial lighting affects sales of the merchandise object.

2. The system of claim 1, wherein the mobile device comprises a tablet computer, a laptop computer, a notebook computer, a mobile computing device, a smart phone, or a cellular telephone.

3. The system of claim 1, wherein the visual imaging system comprises a security camera, a drone, or a smart phone.

4. The system of claim 1, wherein the server system and at least one of the mobile device and the visual imaging system are configured to wirelessly communicate and exchange data with one another over a network.

5. The system of claim 4, wherein the network is selected from the group consisting of Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, and Near Field Communication (NFC).

6. The system of claim 1, wherein the communication and exchange of data between the server system and at least one of the mobile device and the visual imaging system is provided via a cloud-based service.

7. The system of claim 1, wherein the user data associated with at least one of user location and user movement is data captured by one or more sensors of the mobile device.

8. The system of claim 7, wherein the one or more sensors are configured to capture data related to at least one of motion or position of the mobile device, signals transmitted from or to the mobile device, and direct user input with the mobile device.

9. The system of claim 8, wherein the one or more sensors are selected from the group consisting of a motion sensor, a received signal strength (RSS) sensor, a global positioning satellite (GPS) sensor, and a touch sensor.

10. The system of claim 1, wherein the augmented reality image or the virtual reality image comprises a two-dimensional (2D) floor plan, a 2D wall plan, a 2D ceiling plan, a three-dimensional (3D) floor plan, a 3D wall image, a 3D ceiling image, or a 3D environment image.

11. The system of claim 1, wherein the QR code allows the user to interact with the augmented reality image or the virtual reality image in real time.

12. The system of claim 1, wherein the at least one memory contains instructions executable by the at least one processor to further cause the server system to continually update and refine the layout of the environment based on subsequent data received from the visual imaging system or user data received from the mobile device or from one or more other mobile devices associated with separate and different users within the given environment.

13. A computer-implemented method for providing interactive visual images in a mobile-based crowdsourcing platform by a server system configured to communicate with and exchange data with a mobile device, a merchandise or inventory system, and a visual imaging system, the method comprising:
receiving, by the server system, visual image data from the visual imaging system, the visual image data associated with an environment;
identifying, by the server system, from the visual image data, a merchandise object associated with the environment;
analyzing, by the server system, from the visual image data, lighting within the environment including natural and artificial lighting;
analyzing, by the server system, merchandise sales data from the merchandise or inventory system to produce an analysis of how the natural and artificial lighting within the environment affects sales of the merchandise object;
receiving, by the server system, user data from the mobile device, the user data associated with at least one of a location of a user and movement of the user within the environment over a period of time;
prompting, by the server system, the user for verification of location and landmarks including at least the merchandise object; and
rendering, by the server system, on the mobile device, a layout of the environment based on the user data and visual image data, wherein rendering comprises generating a visual model of a layout of the environment in which the user is located or moving to provide an altered reality wherein the user can track information related to the environment, the rendered layout of the environment comprising an augmented reality image or a virtual reality image comprising a QR code accessible by the user to retrieve information about the merchandise object including the analysis of how the natural and artificial lighting affects sales of the merchandise object.

14. The method of claim 13, wherein analyzing the lighting in the environment comprises analyzing at least one of natural light or artificial light.

15. The method of claim 13, wherein the augmented reality image or the virtual reality image comprises a two-dimensional (2D) floor plan, a 2D wall plan, a 2D ceiling plan, a three-dimensional (3D) floor plan, a 3D wall image, a 3D ceiling image, or a 3D environment image.

16. The method of claim 13, wherein the QR code allows the user to interact with the augmented reality image or the virtual reality image in real time.

17. The method of claim 13, wherein the at least one memory contains instructions executable by the at least one processor to further cause the server system to continually update and refine the layout of the environment based on subsequent data received from the visual imaging system or user data received from the mobile device or from one or more other mobile devices associated with separate and different users within the given environment.

18. A computer program product comprising at least one tangible, non-transitory computer-readable medium having embodied therein computer program instructions for providing interactive visual images in a mobile-based crowd-sourcing platform, which, when executed by at least one processor of a computer server system, cause the computer server system to perform processes comprising:

receiving, by the server system, visual image data from the visual imaging system, the visual image data associated with an environment;

identifying, by the server system, from the visual image data, a merchandise object associated with the environment;

analyzing, by the server system, from the visual image data, lighting within the environment including natural and artificial lighting;

analyzing, by the server system, merchandise sales data from the merchandise or inventory system to produce an analysis of how the natural and artificial lighting within the environment affects sales of the merchandise object;

receiving, by the server system, user data from the mobile device, the user data associated with at least one of a location of a user and movement of the user within the environment over a period of time;

prompting, by the server system, the user for verification of location and landmarks including at least the merchandise object; and rendering, by the server system, on the mobile device, a layout of the environment based on the user data and visual image data, wherein rendering comprises generating a visual model of a layout of the environment in which the user is located or moving to provide an altered reality wherein the user can track information related to the environment, the rendered layout of the environment comprising an augmented reality image or a virtual reality image comprising a QR code accessible by the user to retrieve information about the merchandise object including the analysis of how the natural and artificial lighting affects sales of the merchandise object.

* * * * *